J. L. L. ROQUEFORT-VILLENEUVE.
CONSTRUCTIONAL TOY.
APPLICATION FILED SEPT. 16, 1920.
1,428,496.
Patented Sept. 5, 1922.
2 SHEETS—SHEET 2.
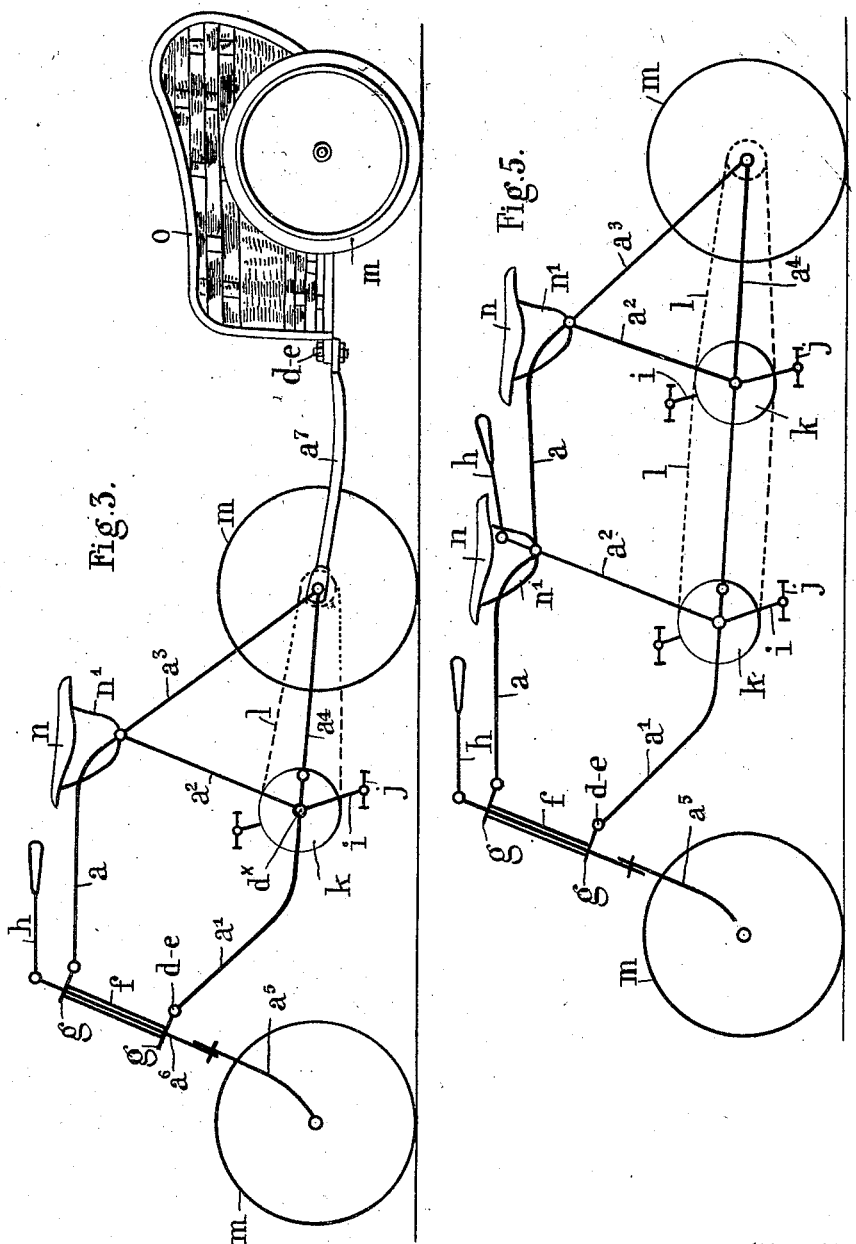
INVENTOR
JEAN L. L. ROQUEFORT-VILLENEUVE
BY Munn & Co.
ATTORNEYS Patented Sept. 5, 1922.

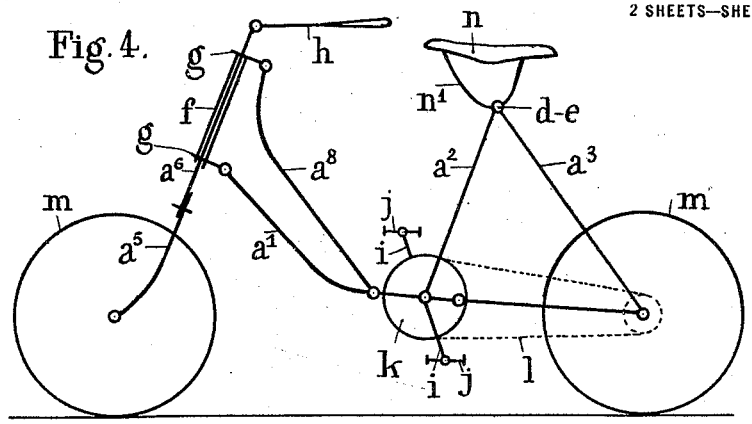
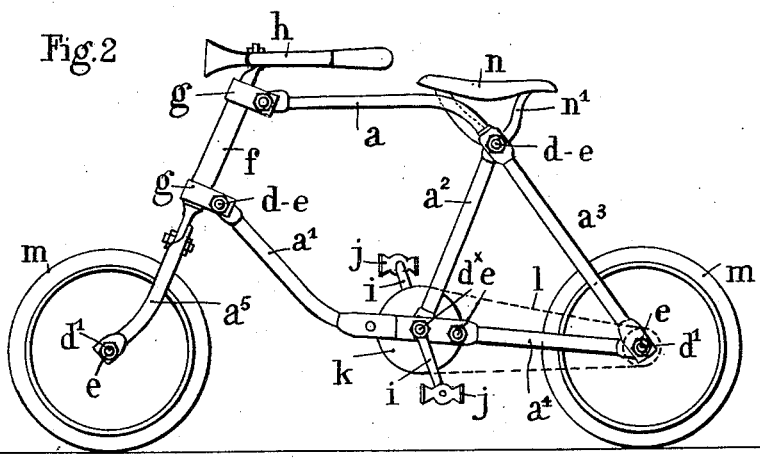
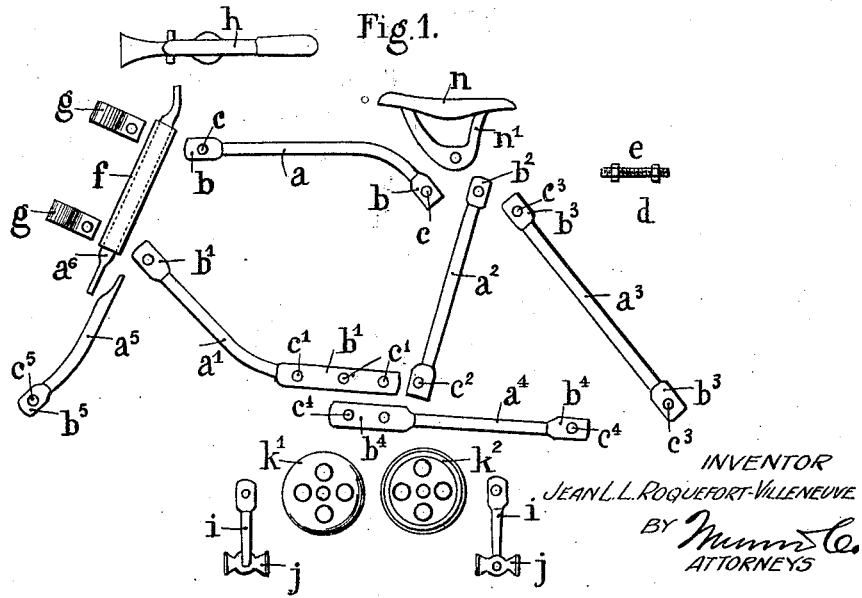

1,428,496

UNITED STATES PATENT OFFICE.

JEAN LÉON LOUIS ROQUEFORT-VILLENEUVE, OF PARIS, FRANCE.

CONSTRUCTIONAL TOY.

Application filed September 16, 1920. Serial No. 410,765.

*To all whom it may concern:*

Be it known that I, JEAN LÉON LOUIS ROQUEFORT-VILLENEUVE, a citizen of the Republic of France, and a resident of 77 Rue du Faubourg Saint Jacques, Paris, France, have invented new and useful Improvements in a Constructional Toy, of which the following is a specification.

This invention relates to a constructional toy.

Constructional toys are known comprising a series of flat perforated metal strips adapted to be secured together by nuts and bolts and combined with lengths of round bar forming axles, handles and the like and also with perforated discs forming wheels, to build various structures and mechanical models.

The present invention has for its object to provide a constructional toy adapted for building models of various kinds of cycles, motor cycles, and similar vehicles.

To this end, according to the invention, the toy comprises a series of bars or rods, of round or substantially rounded section, either solid or hollow, cut into the desired lengths, suitably bent, and provided with flattened perforated portions for the reception of bolts to enable the various parts to be secured together by means of nuts and bolts.

Specially formed portions are provided for forming the forks, steering pillar, handle bars and other characteristic parts of cycles, motor cycles and like vehicles as hereinafter described.

In the following description one example of the invention is shewn as applied to the construction of a minature bicycle, the different modifications that this model type can undergo being also shewn.

In the drawings—

Fig. 1 shews the various parts of the bicycle before being assembled.

Fig. 2 shews the assembled bicycle.

Fig. 3 shews the bicycle fitted with a trailer.

Fig. 4 shews the bicycle changed from a man's bicycle into a woman's.

Fig. 5 shews the bicycle changed into a tandem.

The frame members of the bicycle consist of round bars $a$, $a^1$, $a^2$, $a^3$ $a^4$ (here shewn as made of aluminium) which have flat portions $b$ $b^1$ $b^2$ ... at their ends having one or more holes $c$ $c^1$ $c^2$ ... In order to assemble the different parts it is only necessary to place the flat portions one on the other so that the holes therein coincide and to fasten them by the bolts $d$, $d$, $d$ and nuts $e$. The fork is formed by a round bar $a^5$, bent into a U shape, and flattened not only at its ends to receive the wheel axle but also at its middle so that it can be fixed to the flat end of the steering rod $a^6$. The steering rod is simply slipped into the tube $f$ which is bolted by two small collars $g$ to the ends of the members $a$ and $a^1$ of the frame. The handle bar $h$ is flattened at its centre to allow it to be assembled with the upper end of the steering rod $a^6$. The fastening of all these parts is always carried out by means of a small bolt $d$ and nuts $e$.

The crank hanger is formed by the assembling of the bar $d^x$ with the parts $a^1$, $a^2$ of the frame; on this bar the cranks $i$ furnished with pedals $j$ are secured by two nuts $e$.

The bar $d^x$ also carries the gear wheel $k$ consisting either of a metal disc having a groove for the chain $l$, or of two discs $k^1$ $k^2$ stamped out so as to form a groove when fitted together (see Fig. 1). The wheel axles consist of screwed rods $d^1$ on which the wheels are bolted by nuts $e$. These wheels are formed in the present examples of two discs stamped out so as to form a rim which receives the rubber rings $m$ forming pneumatic tires.

The saddle $n$ is stamped out of sheet metal and is secured to the frame members by a small plate $n^1$ having a hole for the passage of the threaded assembling bolt.

The bicycle may have a trailer (Fig. 3) consisting of a body $o$ of basket work, wood, metal, or other suitable material having a threaded rod forming the axle for wheels similar to those of the bicycle. This trailer is connected to the bicycle on the same principle by two rods $a^7$ flattened at their ends and having holes for their assemblage by screwed bolts.

The man's frame bicycle of Fig. 2 may be very simply changed into a woman's bicycle (Fig. 4) by taking away the member $a$ of the frame and replacing it by another member $a^8$ which is fixed by bolts and nuts to the upper collar $g$ and to the member $a^1$ of the frame provided for this purpose with an extra hole $c^1$.

The bicycle may be changed to a tandem by the addition of new frame members constructed exactly as the members hereinbefore described and secured in the same way (see Fig. 5). The motor cycle may be changed into a side-car combination by the arrangement of a carriage similar to the trailer, Fig. 3, and connected to the motor cycle by suitable rods.

According the dimensions given to the members of the construction, toys can be made varying in size from a few centimeters to sizes sufficient to allow a child to ride on them.

I claim—

1. A toy cycle comprising a tubular member, bars extending rearwardly from said tubular member, collars surrounding said tubular member and having ears, fastening devices extending through the ends of said bars and through said ears, and a steering rod rotatably extending through said tubular member.

2. A toy cycle comprising a tubular member, bars extending rearwardly from said tubular member, collars surrounding said tubular member and having ears, fastening devices extending through the ends of said bars and through said ears, a steering rod rotatably extending through said tubular member, and a U-shaped fork having a bight portion flattened and connected to the forward portion of said steering rod.

3. A take down toy cycle comprising a plurality of bars having their end portions flattened and overlapped, fastening devices extending through the overlapped end portions of said bars, and a wheel connected to the overlapped portions of certain of said bars, a tubular member connected to the forward portions of certain of said bars, a steering rod extending through said tubular member and having its end portions flattened, a handle bar connected to the upper flattened portions of said steering rod, a U-shaped fork having a bight portion flattened and connected to the flattened lower end portion of said steering rod and a wheel connected to said fork.

Dated this 25th day of August, 1920.

JEAN LÉON LOUIS ROQUEFORT-VILLENEUVE.

Witnesses:
JACQUES ARMENGAUD,
W. DEFÉVRIMONT.